US009747598B2

(12) United States Patent
Mogollon et al.

(10) Patent No.: US 9,747,598 B2
(45) Date of Patent: *Aug. 29, 2017

(54) DYNAMIC SECURITY CODE PUSH

(71) Applicant: III HOLDINGS 1, LLC, Wilmington, DE (US)

(72) Inventors: Francisco Mogollon, Scottsdale, AZ (US); Colin T. McCabe, Brooklyn, NY (US)

(73) Assignee: III Holdings 1, LLC, Wilmington, DE (US)

( * ) Notice: Subject to any disclaimer, the term of this patent is extended or adjusted under 35 U.S.C. 154(b) by 793 days.

This patent is subject to a terminal disclaimer.

(21) Appl. No.: 14/010,367

(22) Filed: Aug. 26, 2013

(65) Prior Publication Data

US 2013/0346314 A1 Dec. 26, 2013

Related U.S. Application Data

(63) Continuation-in-part of application No. 13/945,411, filed on Jul. 18, 2013, which is a continuation-in-part
(Continued)

(51) Int. Cl.
H04L 29/06 (2006.01)
G06Q 20/38 (2012.01)
G06Q 20/12 (2012.01)
G06Q 20/40 (2012.01)
G06Q 30/06 (2012.01)
G06Q 20/10 (2012.01)
(Continued)

(52) U.S. Cl.
CPC ......... *G06Q 20/385* (2013.01); *G06Q 20/102* (2013.01); *G06Q 20/12* (2013.01); *G06Q 20/382* (2013.01); *G06Q 20/40* (2013.01); *G06Q 30/06* (2013.01); *G06Q 30/0601* (2013.01); *G06F 17/243* (2013.01); *G06Q 40/00* (2013.01)

(58) Field of Classification Search
CPC .... G06Q 20/385; G06Q 20/382; G06Q 20/12; G06Q 30/0601; G06Q 30/06; G06Q 20/102; G06Q 20/40; G06Q 40/00; G06F 17/243
USPC .......................................................... 726/26
See application file for complete search history.

(56) References Cited

U.S. PATENT DOCUMENTS 4,864,557 A   9/1989  Morton et al.
5,311,596 A * 5/1994  Scott ................ G06F 21/31
                                                 380/266
(Continued)

FOREIGN PATENT DOCUMENTS

WO     0199019    12/2001

OTHER PUBLICATIONS

Office Action in U.S. Appl. No. 13/604,976 mailed Jan. 6, 2016, 12 pages.
(Continued)

*Primary Examiner* — David García Cervetti
(74) *Attorney, Agent, or Firm* — Meyertons, Hood, Kivlin, Kowert & Goetzel, P.C.

(57) ABSTRACT

A system and method for fraud prevention is provided. This system and method may comprise a web browser having form filing capabilities. This system may interact with a financial institution to request and receive a dynamic security code to be used in merchant checkout page to complete a transaction.

20 Claims, 3 Drawing Sheets

Related U.S. Application Data of application No. 11/866,009, filed on Oct. 2, 2007, now Pat. No. 8,515,840, and a continuation-in-part of application No. 13/708,422, filed on Dec. 7, 2012, which is a continuation-in-part of application No. 13/604,976, filed on Sep. 6, 2012.

(51) Int. Cl.
G06F 17/24 (2006.01)
G06Q 40/00 (2012.01)

(56) References Cited

U.S. PATENT DOCUMENTS

| | | | |
|---|---|---|---|
| 5,602,933 A | 2/1997 | Blackwell et al. | |
| 5,648,647 A | 7/1997 | Seiler | |
| 5,696,952 A | 12/1997 | Pontarelli | |
| 5,768,602 A | 6/1998 | Dhuey | |
| 5,812,668 A | 9/1998 | Weber | |
| 5,815,657 A | 9/1998 | Williams et al. | |
| 5,832,283 A | 11/1998 | Chou et al. | |
| 5,838,315 A | 11/1998 | CrayCroft et al. | |
| 5,850,446 A | 12/1998 | Berger et al. | |
| 5,913,202 A | 6/1999 | Motoyama | |
| 5,949,045 A | 9/1999 | Ezawa et al. | |
| 5,996,076 A | 11/1999 | Rowney et al. | |
| 6,023,679 A | 2/2000 | Acebo et al. | |
| 6,029,154 A | 2/2000 | Pettitt | |
| 6,160,874 A | 12/2000 | Dickerman et al. | |
| 6,223,289 B1 | 4/2001 | Wall et al. | |
| 6,237,004 B1 | 5/2001 | Dodson et al. | |
| 6,256,019 B1 | 7/2001 | Allport | |
| 6,347,339 B1 | 2/2002 | Morris et al. | |
| 6,349,335 B1 | 2/2002 | Jenney | |
| 6,374,145 B1 | 4/2002 | Lignoul | |
| 6,446,048 B1 | 9/2002 | Wells et al. | |
| 6,463,474 B1 | 10/2002 | Fuh et al. | |
| 6,484,174 B1 | 11/2002 | Wall et al. | |
| 6,490,624 B1 | 12/2002 | Sampson et al. | |
| 6,560,322 B2 | 5/2003 | Yamaguchi et al. | |
| 6,560,711 B1 | 5/2003 | Given et al. | |
| 6,589,290 B1* | 7/2003 | Maxwell | G06F 17/2247 |
| | | | 715/224 |
| 6,606,606 B2 | 8/2003 | Starr | |
| 6,607,136 B1* | 8/2003 | Atsmon | G06F 21/34 |
| | | | 235/487 |
| 6,609,154 B1 | 8/2003 | Fuh et al. | |
| 6,615,244 B1 | 9/2003 | Singhal | |
| 6,631,405 B1 | 10/2003 | Kobata | |
| 6,658,393 B1 | 12/2003 | Basch et al. | |
| 6,704,714 B1 | 3/2004 | O'Leary et al. | |
| 6,732,919 B2 | 5/2004 | Macklin et al. | |
| 6,859,212 B2 | 2/2005 | Kumar et al. | |
| 6,873,974 B1 | 3/2005 | Schutzer | |
| 6,926,203 B1 | 8/2005 | Sehr | |
| 6,999,943 B1 | 2/2006 | Johnson et al. | |
| 7,024,556 B1 | 4/2006 | Hadjinikitas et al. | |
| 7,036,087 B1 | 4/2006 | Odom | |
| 7,051,002 B2 | 5/2006 | Keresman, III et al. | |
| 7,100,203 B2 | 8/2006 | Tosey | |
| 7,134,087 B2 | 11/2006 | Bushold et al. | |
| 7,136,835 B1 | 11/2006 | Flitcroft et al. | |
| 7,149,741 B2 | 12/2006 | Burkey et al. | |
| 7,155,411 B1 | 12/2006 | Blinn et al. | |
| 7,331,518 B2 | 2/2008 | Rable | |
| 7,337,210 B2 | 2/2008 | Barsness | |
| 7,444,331 B1* | 10/2008 | Nachenberg | G06F 17/30477 |
| 7,469,233 B2 | 12/2008 | Shooks et al. | |
| 7,493,288 B2 | 2/2009 | Biship et al. | |
| 7,505,941 B2 | 3/2009 | Bishop et al. | |
| 7,584,153 B2 | 9/2009 | Brown et al. | |
| 7,640,185 B1 | 12/2009 | Giordano et al. | |
| 7,660,756 B2 | 2/2010 | Nakamura et al. | |
| 7,748,620 B2 | 7/2010 | Gomez et al. | |
| 7,792,748 B1 | 9/2010 | Ebersole et al. | |
| 7,849,014 B2 | 12/2010 | Erikson et al. | |
| 7,904,332 B1 | 3/2011 | Merkley, Jr. et al. | |
| 7,912,917 B2* | 3/2011 | Chakra | G06F 17/243 |
| | | | 709/217 |
| 7,953,671 B2 | 5/2011 | Bishop et al. | |
| 8,055,997 B2* | 11/2011 | Gagnon | G06F 17/2247 |
| | | | 715/222 |
| 8,087,088 B1* | 12/2011 | Pennington | G06F 11/3692 |
| | | | 709/206 |
| 8,214,292 B2 | 7/2012 | Duggal et al. | |
| 8,424,073 B2* | 4/2013 | Sturms | G06F 17/3089 |
| | | | 713/159 |
| 8,515,840 B2 | 8/2013 | McCabe et al. | |
| 8,615,468 B2 | 12/2013 | Varadarajan | |
| RE45,371 E * | 2/2015 | Simons | G06F 17/243 |
| | | | 715/224 |
| 2001/0034717 A1 | 10/2001 | Whitworth | |
| 2001/0051996 A1 | 12/2001 | Cooper et al. | |
| 2002/0013788 A1* | 1/2002 | Pennell | G06F 17/243 |
| | | | 715/224 |
| 2002/0023108 A1* | 2/2002 | Daswani | G06F 17/243 |
| | | | 715/224 |
| 2002/0026423 A1 | 2/2002 | Maritzen et al. | |
| 2002/0035548 A1 | 3/2002 | Hogan et al. | |
| 2002/0052852 A1 | 5/2002 | Bozeman | |
| 2002/0062342 A1* | 5/2002 | Sidles | G06F 17/243 |
| | | | 709/203 |
| 2002/0077978 A1* | 6/2002 | O'Leary | G06Q 20/04 |
| | | | 705/40 |
| 2002/0091554 A1 | 7/2002 | Burrows | |
| 2002/0103712 A1* | 8/2002 | Rollins | G06Q 20/02 |
| | | | 705/26.8 |
| 2002/0120583 A1 | 8/2002 | Keresman, III et al. | |
| 2002/0138418 A1 | 9/2002 | Zarin et al. | |
| 2002/0153424 A1 | 10/2002 | Li | |
| 2002/0154162 A1* | 10/2002 | Bhatia | G06Q 30/06 |
| | | | 715/745 |
| 2002/0161721 A1* | 10/2002 | Yuan | G06Q 20/04 |
| | | | 705/65 |
| 2002/0165954 A1 | 11/2002 | Eshghi et al. | |
| 2002/0169988 A1* | 11/2002 | Vandergeest | H04L 63/126 |
| | | | 726/4 |
| 2002/0174065 A1 | 11/2002 | Coward | |
| 2002/0174335 A1 | 11/2002 | Zhang et al. | |
| 2002/0188573 A1 | 12/2002 | Calhoon | |
| 2002/0194219 A1* | 12/2002 | Bradley | G06F 17/243 |
| | | | 715/223 |
| 2003/0004897 A1* | 1/2003 | Smith, IV | G06F 17/30867 |
| | | | 705/76 |
| 2003/0023754 A1 | 1/2003 | Eichstadt et al. | |
| 2003/0028481 A1 | 2/2003 | Flitcroft et al. | |
| 2003/0055689 A1 | 3/2003 | Block et al. | |
| 2003/0061157 A1 | 3/2003 | Hirka et al. | |
| 2003/0088483 A1 | 5/2003 | Moyer | |
| 2003/0105707 A1 | 6/2003 | Audebert et al. | |
| 2003/0120615 A1 | 6/2003 | Kuo | |
| 2003/0159071 A1* | 8/2003 | Martinez | G06F 21/31 |
| | | | 726/8 |
| 2003/0167226 A1 | 9/2003 | Britton et al. | |
| 2003/0195963 A1 | 10/2003 | Song et al. | |
| 2003/0225687 A1 | 12/2003 | Lawrence | |
| 2003/0229893 A1 | 12/2003 | Sgaraglino | |
| 2004/0003258 A1* | 1/2004 | Billingsley | G06F 21/36 |
| | | | 713/182 |
| 2004/0006710 A1* | 1/2004 | Pollutro | G06F 21/31 |
| | | | 726/28 |
| 2004/0030991 A1* | 2/2004 | Hepworth | G06F 17/243 |
| | | | 715/226 |
| 2004/0059930 A1 | 3/2004 | DiFalco et al. | |
| 2004/0123154 A1* | 6/2004 | Lippman | G06F 21/50 |
| | | | 726/11 |
| 2004/0167854 A1 | 8/2004 | Knowles et al. | |
| 2004/0205526 A1* | 10/2004 | Borodovski | G06F 17/243 |
| | | | 715/224 |
| 2004/0220857 A1* | 11/2004 | Lapstun | G06F 3/014 |
| | | | 705/14.19 |

(56) References Cited

U.S. PATENT DOCUMENTS

| | | | |
|---|---|---|---|
| 2004/0230647 A1* | 11/2004 | Rawat | G06F 17/30899 709/203 |
| 2004/0232225 A1 | 11/2004 | Bishop et al. | |
| 2005/0043997 A1 | 2/2005 | Sahota et al. | |
| 2005/0044423 A1* | 2/2005 | Mellmer | G06F 21/31 726/4 |
| 2005/0108178 A1 | 5/2005 | York | |
| 2005/0187883 A1 | 8/2005 | Bishop et al. | |
| 2005/0210263 A1* | 9/2005 | Levas | G06F 21/33 713/182 |
| 2005/0216356 A1* | 9/2005 | Pearce | G06F 17/3089 715/207 |
| 2005/0240522 A1 | 10/2005 | Kranzley et al. | |
| 2005/0246292 A1 | 11/2005 | Sarcanin | |
| 2005/0254514 A1* | 11/2005 | Lynn | G06F 21/00 370/450 |
| 2005/0268107 A1* | 12/2005 | Harris | G06F 21/31 713/182 |
| 2006/0026076 A1 | 2/2006 | Raymond | |
| 2006/0026689 A1 | 2/2006 | Barker et al. | |
| 2006/0059434 A1* | 3/2006 | Boss | G06F 21/46 715/780 |
| 2006/0106680 A1 | 5/2006 | Shafron et al. | |
| 2006/0106738 A1 | 5/2006 | Schleicher | |
| 2006/0122899 A1* | 6/2006 | Lee | G06Q 30/06 705/26.62 |
| 2006/0156385 A1 | 7/2006 | Chiviendacz et al. | |
| 2006/0168509 A1* | 7/2006 | Boss | G06F 17/243 715/226 |
| 2006/0179404 A1* | 8/2006 | Yolleck | G06F 17/243 715/272 |
| 2006/0206709 A1* | 9/2006 | Labrou | G06Q 20/18 713/167 |
| 2006/0212387 A1 | 9/2006 | Jensen | |
| 2006/0269061 A1 | 11/2006 | Balasubramanian et al. | |
| 2006/0278698 A1 | 12/2006 | Lovett | |
| 2006/0282795 A1* | 12/2006 | Clark | G06Q 10/10 715/840 |
| 2007/0005967 A1 | 1/2007 | Mister et al. | |
| 2007/0074101 A1* | 3/2007 | Uthe | G06F 17/243 715/236 |
| 2007/0114274 A1* | 5/2007 | Gibbs | G06Q 20/12 235/380 |
| 2007/0140489 A1* | 6/2007 | Dharmarajan | H04L 9/0866 380/228 |
| 2007/0192249 A1 | 8/2007 | Biffle et al. | |
| 2007/0198405 A1 | 8/2007 | Bishop et al. | |
| 2007/0215698 A1 | 9/2007 | Perry | |
| 2007/0239621 A1 | 10/2007 | Stukanov | |
| 2007/0241183 A1 | 10/2007 | Brown et al. | |
| 2007/0260544 A1* | 11/2007 | Wankmueller | G06Q 20/40 705/44 |
| 2007/0276765 A1 | 11/2007 | Hazel et al. | |
| 2007/0282674 A1 | 12/2007 | Gomes et al. | |
| 2007/0284433 A1 | 12/2007 | Domenica et al. | |
| 2007/0288392 A1 | 12/2007 | Peng et al. | |
| 2007/0294169 A1 | 12/2007 | Beck et al. | |
| 2008/0010215 A1* | 1/2008 | Rackley, III | G06Q 20/042 705/70 |
| 2008/0040276 A1 | 2/2008 | Hammad et al. | |
| 2008/0040285 A1 | 2/2008 | Wankmueller | |
| 2008/0054081 A1 | 3/2008 | Mullen | |
| 2008/0056501 A1* | 3/2008 | McGough | H04L 63/062 380/281 |
| 2008/0065886 A1* | 3/2008 | McGough | H04L 63/061 713/168 |
| 2008/0072293 A1* | 3/2008 | D'Urso | G06F 21/31 726/4 |
| 2008/0082821 A1* | 4/2008 | Pritikin | G06F 17/243 713/169 |
| 2008/0091618 A1* | 4/2008 | Obrea | G06F 21/31 705/76 |
| 2008/0098292 A1* | 4/2008 | Embry | G06F 17/243 715/226 |
| 2008/0115201 A1* | 5/2008 | Sturms | G06F 17/3089 726/9 |
| 2008/0126260 A1* | 5/2008 | Cox | G06Q 20/20 705/67 |
| 2008/0154770 A1 | 6/2008 | Rutherford et al. | |
| 2008/0172598 A1* | 7/2008 | Jacobsen | G06F 17/243 715/224 |
| 2008/0184102 A1* | 7/2008 | Selig | G06F 17/243 715/234 |
| 2008/0201264 A1 | 8/2008 | Brown et al. | |
| 2008/0209223 A1* | 8/2008 | Nandy | G06F 21/36 713/185 |
| 2008/0222047 A1 | 9/2008 | Boalt | |
| 2008/0257959 A1 | 10/2008 | Oved | |
| 2008/0275821 A1 | 11/2008 | Bishop et al. | |
| 2008/0306876 A1 | 12/2008 | Horvath et al. | |
| 2008/0313529 A1* | 12/2008 | Gwozdz | G06F 17/243 715/224 |
| 2008/0314977 A1 | 12/2008 | Domenica et al. | |
| 2009/0024533 A1 | 1/2009 | Fernandes et al. | |
| 2009/0048953 A1 | 2/2009 | Hazel et al. | |
| 2009/0077655 A1* | 3/2009 | Sermersheim | G06F 21/33 726/20 |
| 2009/0150295 A1 | 6/2009 | Hatch et al. | |
| 2009/0254479 A1 | 10/2009 | Pharris | |
| 2009/0313134 A1 | 12/2009 | Faith et al. | |
| 2010/0031022 A1* | 2/2010 | Kramer | G06F 21/6218 713/155 |
| 2010/0082444 A1 | 4/2010 | Lin et al. | |
| 2010/0100484 A1 | 4/2010 | Nguyen et al. | |
| 2010/0125509 A1 | 5/2010 | Kranzley et al. | |
| 2010/0257068 A1 | 10/2010 | Duggal et al. | |
| 2011/0009051 A1 | 1/2011 | Khedouri et al. | |
| 2011/0047039 A1 | 2/2011 | Crames et al. | |
| 2011/0184867 A1 | 7/2011 | Varadarajan | |
| 2011/0202462 A1 | 8/2011 | Keenan | |
| 2012/0059762 A1 | 3/2012 | Muscato | |
| 2012/0131094 A1 | 5/2012 | Lyons et al. | |
| 2012/0173325 A1 | 7/2012 | Johri | |
| 2012/0203697 A1 | 8/2012 | Morgan et al. | |
| 2013/0325721 A1 | 12/2013 | Ghong et al. | |
| 2014/0006184 A1 | 1/2014 | Godsey | |

OTHER PUBLICATIONS

Office Action dated Oct. 7, 2013 in U.S. Appl. No. 13/945,411.
Final Office Action dated Nov. 6, 2013 in U.S. Appl. No. 13/467,910.
Office Action dated Dec. 6, 2013 in U.S. Appl. No. 13/605,120.
Advisory Action dated Jan. 31, 2014 in U.S. Appl. No. 13/467,910.
Final Office Action dated Mar. 28, 2014 in U.S. Appl. No. 13/605,120.
Final Office Action dated Feb. 10, 2014 in U.S. Appl. No. 13/945,411.
Office Action dated Feb. 27, 2014 in U.S. Appl. No. 13/467,910.
Advisory Action dated Mar. 4, 2014 in U.S. Appl. No. 13/945,411.
Advisory Action dated Apr. 10, 2014 in U.S. Appl. No. 13/605,120.
Summons to attend oral proceedings in EP Application No. 08834858.6 dated Apr. 22, 2015, 9 pages.
Office Action in U.S. Appl. No. 13/605,120 mailed May 11, 2015, 9 pages.
Office Action in U.S. Appl. No. 13/708,422 mailed Jul. 30, 2015, 12 pages.
Global Credit Authorization Guide (v3.2), Aug. 11, 2006.
MasterCard SecureCode for Online Merchants, Jan. 2006.
Colin Baptie; Visa by Topic; http://corporate.visa.com/md/fs/ecommerce/passcode_authorization.jsp?topic=tech; Mar. 21, 2007.
Visa by Topic Fact Sheet: Dynamic Password Authentication; http://corporate.visa.com/md/fs/ecommerce/passcode_authorization_print.jsp; Mar. 20, 2007.
Lisa Phifer; Beyond Passwords Part 2: Implementing the Vision; www.smallbusinesscomputing.com/webmaster/article.php/3498116; Apr. 15, 2005.

(56) References Cited

OTHER PUBLICATIONS

WebLink Implementation Guide Card-Not-Present Transactions Version 1.0; pp. 1-3 and 42.
PCT; International Search Report and Written Opinion dated Nov. 3, 2008 in Application No. PCT/US08/73555.
USPTO; Office Action dated May 1, 2009 in U.S. Appl. No. 11/847,088.
USPTO; Final Office Action dated Aug. 4, 2009 in U.S. Appl. No. 11/847,088.
USPTO; Advisory Action dated Sep. 30, 2009 in U.S. Appl. No. 11/847,088.
USPTO; Office Action dated Nov. 19, 2009 in U.S. Appl. No. 11/847,088.
USPTO; Final Office Action dated May 7, 2010 in U.S. Appl. No. 11/847,088.
USPTO; Advisory Action dated Jun. 22, 2010 in U.S. Appl. No. 11/847,088.
USPTO; Notice of Allowance dated Sep. 20, 2010 in U.S. Appl. No. 11/847,088.
USPTO; Office Action dated May 19, 2011 in U.S. Appl. No. 12/913,097.
USPTO; Final Office Action dated Jun. 30, 2011 in U.S. Appl. No. 12/913,097.
USPTO; Advisory Action dated Jul. 18, 2011 in U.S. Appl. No. 12/913,097.
USPTO; Notice of Allowance dated Nov. 2, 2011 in U.S. Appl. No. 12/913,097.
USPTO; Notice of Allowance dated Mar. 13, 2012 in U.S. Appl. No. 13/299,865.
USPTO; Office Action dated Feb. 2, 2012 in U.S. Appl. No. 13/299,865.
USPTO; Office Action dated Mar. 1, 2013 in U.S. Appl. No. 13/605,120.
USPTO; Office Action dated Jan. 4, 2013 in U.S. Appl. No. 13/467,910.
USPTO; Final Office Action dated Apr. 3, 2013 in U.S. Appl. No. 13/467,910.
USPTO; Advisory Action dated May 9, 2013 in U.S. Appl. No. 13/467,910.
Office Action dated Jun. 21, 2013 in U.S. Appl. No. 13/605,120.
Office Action dated Jul. 19, 2013 in U.S. Appl. No. 13/467,910.
Office Action dated Mar. 23, 2010 in U.S. Appl. No. 11/866,009.
Final Office Action dated Sep. 2, 2010 in U.S. Appl. No. 11/866,009.
Advisory Action dated Nov. 19, 2010 in U.S. Appl. No. 11/866,009.
Office Action dated Jul. 11, 2011 in U.S. Appl. No. 11/866,009.
Final Office Action dated Dec. 22, 2011 in U.S. Appl. No. 11/866,009.
Advisory Action dated Feb. 29, 2012 in U.S. Appl. No. 11/866,009.
Notice of Allowance dated May 10, 2013 in U.S. Appl. No. 11/866,009.
EP; Examination Report dated Oct. 13, 2011 in European Application No. 08834858.6.
International Preliminary Report on Patentability dated Apr. 15, 2010 in Application No. PCT/US2008/078420.
International Search Report dated Dec. 2, 2008 in Application No. PCT/US2008/078420.
Written Opinion dated Dec. 2, 2008 in Application No. PCT/US2008/078420.
Office Action dated Oct. 23, 2012 in Canadian Application No. 2,701,952.
"The New Google Toolbar," http://www.axi.ca/tca/Nov2003/technologytips_1.shtml, The Canadian Association, Nov. 2003.
"About Autofill," http://toolbar.google.com/autofill_help.html, Google, (believed to be at least as old as Nov. 2003.).
"ECML v1.1: Field Specifications for E-Commerce," http://www.ietf.org/rfc/rfc3106.txt, The Internet Engineering Task Force, Apr. 2001.
"Discover Card Introduces Discover DeskshopSM 2.0: The first real solution for safer, easier online shopping," http://pressroom.discovercard.com/data/articles/2000/11/28/200308151420451.prt.shtml#top, Discover Financial Services, Nov. 28, 2000.
"Secure Online Account Numbers," http://www2.discovercard.com/deskshop/deskshop.shtml, Discover Financial Services, (believed to be at least as old as Nov. 28, 2000).
"Electronic Wallets Make Shopping Online Faster and Easier," http://web.archive.org/web/20040325202354/www.citibank.com/us/cards/cardserv/shopping/wallet.htm, 2004.
"Virtual Account Numbers," http://web.archive.org/web/20040202024007/www.citibank.com/us/cards/cardserv/shopping/van.htm, 2003.
"Citibank Enhances Online Credit Card Fraud Protection for Consumers, Introduces Virtual Account Numbers," Market Wire, Jun. 2002, http://findarticles.com/p/articles/mi_pwwi/is_200206/ai_mark02043877/print.
"Citibank Van FAQ," https://www.accountonline.com/View?docId=VanFAQOutsidePop&siteId=CB#5, Citicards, (believed to be at least as old as Jun. 2002).
"Citi Offers Virtual Account Numbers to Wary Online Shoppers," http://www.creditcards.com/Citi-Offers-Virtual-Account-Numbers.php, CreditCards.com, Feb. 10, 2006.
Office Action in U.S. Appl. No. 13/604,976 mailed Sep. 29, 2014, 10 pages.
Office Action in U.S. Appl. No. 13/708,422 mailed Jan. 21, 2016, 29 pages.
Office Action in U.S. Appl. No. 13/945,411 mailed Nov. 13, 2015, 19 pages.
Office Action in U.S. Appl. No. 13/605,120 mailed Jun. 3, 2016, 10 pages.
Office Action in U.S. Appl. No. 13/604,976 mailed Aug. 10, 2016, 12 pages.
Office Action in U.S. Appl. No. 13/945,411 mailed Jun. 16, 2016, 27 pages.
Decision on Appeal, Ex parte Lawrence B. Farr, United States Patent and Trademark Office, Before the Patent Trial and Appeal Board, Appeal 2013-006211, Mar. 31, 2015, 11 pages.
Decision on Appeal, Ex parte Lesley Lind, United States Patent and Trademark Office, Before the Patent Trial and Appeal Board, Appeal 2010-005289, Aug. 30, 2012, 6 pages.

\* cited by examiner

DYNAMIC SECURITY CODE PUSH

CROSS-REFERENCE TO RELATED APPLICATIONS

This application is a Continuation-In-Part of, claims priority to and the benefit of, U.S. patent application Ser. No. 13/945,411, entitled "FRAUD CONTROL INTEGRATED FORM FILLING TOOL," filed Jul. 18, 2013. The '411 application is a Continuation-In-Part of, claims priority to and the benefit of, U.S. Pat. No. 8,515,840 issued Aug. 20, 2013 (aka U.S. patent application Ser. No. 11/866,009, entitled "MODULAR ELECTRONIC WALLET" and filed on Oct. 2, 2007). The '411 application is also a Continuation-In-Part of, claims priority to and the benefit of, U.S. patent application Ser. No. 13/708,422, entitled "AUTHENTICATION USING DYNAMIC CODES," filed Dec. 7, 2012. The '422 application is a continuation-in-part of, and claims priority to and the benefit of, U.S. patent application Ser. No. 13/604,976 titled "AUTHENTICATION USING DYNAMIC CODES (fka SMARTPHONE BARCODE TRANSACTIONS)" filed on Sep. 6, 2012. All of which are incorporated herein by reference in their entirety for all purposes.

FIELD

The present disclosure generally relates to electronic payments using transaction accounts.

BACKGROUND

Inputting personal information into Internet web page forms is often a repetitive and time-consuming process. For example, in the online shopping context, a consumer desiring to complete a checkout process at a merchant's website may likely input most or all of the following information: first name, last name, middle initial, street address, billing address, telephone number, e-mail address, and financial transaction account information. This information may not be the same each time a shopper conducts an online purchase. For example, a shopper may use different credit cards for various purchases. Thus, each time the consumer wishes to purchase from another online merchant, a consumer inputs the same or similar information to complete the online checkout process.

This manual entry of information into online forms is tedious and fraught with the likelihood of omissions and input errors. For example, a shopper typing payment information into a checkout webpage may forget to complete some of the fields in the online form. This error may result in losing all of the typed information, if a user then presses the "back" button in a web browser, frustrating a user and increasing the time to complete the data input. In online shopping, such errors may go undetected by the shopper until after the checkout process is completed and the shopper may only be notified at a later time by the merchant that the information is incomplete or erroneous. In such a case, these problems could lead to an online shopping order being delayed or possibly canceled.

In addition, a person inputting information into Internet web pages may have different sets of information that they wish to input for different web pages. For example, in online shopping, a shopper may have multiple credit cards that they use for different purposes, for example, to get an extended product warranty, to maximize loyalty points, or to earn cash back bonuses for specific types of purchases. In such a case, a shopper inputs the information into the web page that is relevant for the specific credit card for that purchase type. This manual process again is typically time consuming and fraught with error.

A further problem with existing web page input methods is that the user inputting the information must either input from memory, transcribe from another source (such as from a credit card), or "cut and paste" the information into the online fields from an electronic document (e.g., a text editor or word processor). In the case of online shopping, this typically means that a shopper has to search for a credit card from a wallet or a purse, and then transcribe the information into the web page, field by field. A shopper that uses a specific credit card for only limited purposes may forget to use the card, or may inadvertently not use the card at all.

In addition, in the context of online shopping, a shopper frequently must have physical possession of the credit card in order to read the information to input. Alternatively, a shopper could store the information locally on a storage medium, such as in a file locally stored on a computer hard disk drive, and cut and paste the information into the webpage. However, this may be undesirable because the information stored on the computer may not be secure from other users. In addition, cutting and pasting pieces of information into a web page is also tedious and error prone.

Therefore, it would be useful to be able to automate the input of information into web pages in a flexible and secure manner such that the time it takes to input information into webpage fields is reduced and the information used can be tailored to the webpage automatically by the user. More specifically, in the Internet shopping context, it would be useful to be able to allow a shopper to have a way of securely pre-storing transaction card information for the shopper's transaction cards and presenting the shopper with all of their transaction card information such that they can automatically input all purchase information into any Internet checkout webpage for the specific transaction card selected for the purchase.

SUMMARY

The present disclosure relates to a payment system that addresses, among other things, the aforementioned deficiencies in prior systems.

Methods and systems described herein may be related to and associated with form filled information, such as information filled into a checkout page of a merchant website. A computer-implemented method may include receiving log in information to access at least one of preferences and capabilities of the personalized web browsing application (or module). A personalized web browsing application may be a web browser and/or web browsing application configured to deliver a personalized user experience based on stored information. This log on information may be verified and validated. Verification may relate to the form, such as accurate characters and length whereas validated may comprise checking against a lookup table for accuracy. The method may further include permitting access to a form filling tool in response to the verification of the log in information. A personalized web browsing application may populate transaction information in electronic fields of the merchant electronic form. The method may further include receiving a transaction account holder selection of a transaction account to populate a merchant electronic form with transaction information. The method may further include identifying the issuer of the transaction account. The method may further include transmitting a request for a dynamic security code to a transaction account issuer system in response to the identification.

A transaction account issuer system may determine at least one of a pre-stored contact channel and contact address of the transaction account holder. The contact address may be at least one of an email address, an instant messaging address, a social media contact address, a telephone number, a SMS address, mobile application messaging address, a mobile device messaging address. The contact channel and contact address of the transaction account holder may be transmitted to the personalized web browsing application by the transaction account issuer system for display and/or partial display in a message. The personalized web browsing application may display a message to the transaction account holder indicating the dynamic security code is being transmitted to at least one of the pre-stored contact channel and contact address of the transaction account holder.

A dynamic security code generated by the transaction account issuer system may be transmitted to a transaction account holder computing device, such as a computer, mobile device or tablet. The transaction account holder may populate, such as by selecting a link and entering information into a field, the received dynamic security code into a security code field of the merchant electronic form.

This merchant electronic form may be fully filled out and transmitted by a transaction account holder (e.g. user) to the merchant such as to initiate a transaction. The merchant may generate a transaction authorization message comprising information received in the electronic form from the transaction account holder. The transaction authorization message may comprise the dynamic security code. The transaction account issuer system may associates the received transaction authorization request comprising a dynamic security code with the transaction account holder. The transaction account issuer system may authorize the transaction authorization request. Chargeback protection to the transaction based on use of the personalized web browsing application may be provided to the merchant by the transaction issuer. Enhanced authorization data may be transmitted by the personalized web browsing application and/or personalized web browsing application host to the transaction account issuer.

A computer-implemented method may include a financial institution computer based system receiving a request to generate a dynamic security code from a personalized web browsing application. The personalized web browsing application may be configured to perform electronic form filling. The method may include generating the dynamic security code, and determining the contact information of a holder of a transaction account associated with the request to generate a dynamic security code.

The method may include transmitting the dynamic security code to the transaction account computing device via the contact information.

The method may include associating a received transaction authorization request message comprising the dynamic security code data with the holder of the transaction account. A merchant may transmit the transaction authorization request message to the financial institution computer based system in response to receiving a filled electronic form. The method may include authorizing the transaction associated with the received transaction authorization request message at least partially based on the associating. The personalized web browsing application may display a message to the holder of the transaction account indicating the dynamic security code is being transmitted to contact information of the transaction account holder. The holder of the transaction account may retrieve and populate the received dynamic security code in a security code field of a merchant electronic form.

Disclosed herein is a system comprising a processor, a tangible, non-transitory memory configured to communicate with the processor; the tangible, non-transitory memory having instructions stored thereon that, in response to execution by the processor, causes the processor to perform operations a personalized web browsing application in communication with the processor, wherein the personalized web browsing application is configured to receive log in information to access at least one of preferences and capabilities of the personalized web browsing application. The personalized web browsing application may be further configured to permit access to a form filling tool, in response to the verification of the log in information. The personalized web browsing application may be further configured to receive a transaction account holder selection of a transaction account to populate a merchant electronic form with transaction information. The personalized web browsing application may be further configured to identify the issuer of the transaction account. The personalized web browsing application may be further configured to transmit a request for a dynamic security code to a transaction account issuer system in response to the identification.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
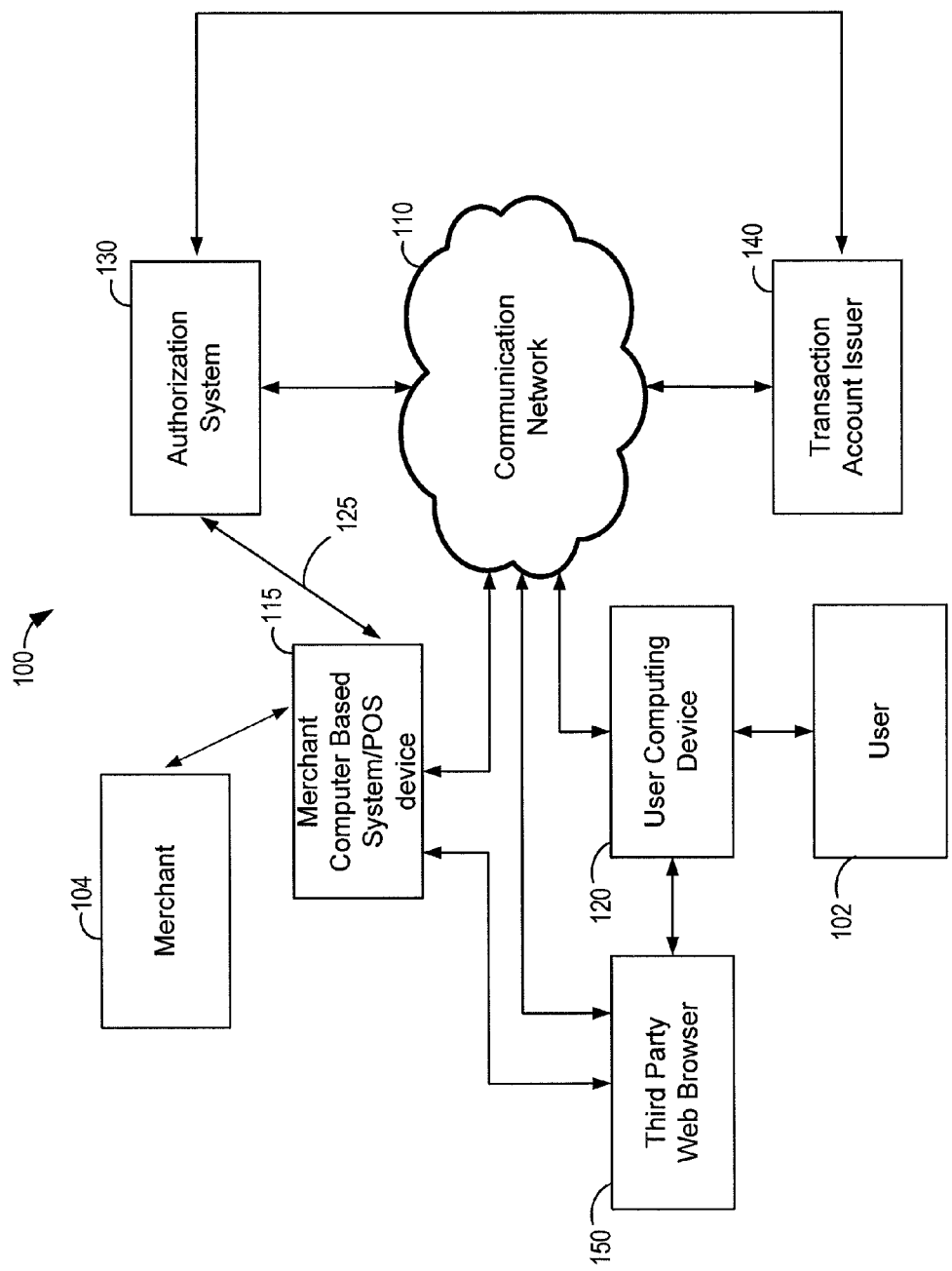
FIG. 1 is a block diagram illustrating exemplary systems for automated data entry and fraud prevention, in accordance with various embodiments.

According to various embodiments and with reference to FIG. 1, the systems may include an entity, such as a user 102 comprising a user computing device 120, a merchant 104 comprising a merchant computer based system 115, a third party web browser application 150, an authorization system 130, and various databases. The user computing device 120, merchant computer based system 115, third party web browser application 150 and authorization system 130 may be coupled together directly and/or through one or more communication networks 110. Authorization system 130 may include gateway 125 for receiving 1100 formatted messages, such as transaction authorization, e.g. "1100 formatted messages" from merchants 104. Authorization system 130 may also receive data directly from user computing device 120, such as via communications network 110 and/or third party web browser application 150.

User 102 may interact with merchant 104 (e.g., merchant system 115) to make a purchase using a transaction account. Merchant 104 may request authorization to accept the transaction account code as payment by sending a request to authorization system 130, such as over gateway 125 over network 110 (e.g., according to various payment account industry standards).

Authorization system 130 may perform risk analysis on the request using information, for example, from the account holder database and the transaction database. Based on the risk analysis, authorization system 130 may create an authorization decision to approve, deny or refer the request. The authorization decision is provided to merchant 104. This authorization decision may be provided to merchant 104 through gateway 125, such as via a proprietary payment network. Merchant 104 may complete the transaction if the request is approved, verify that the merchant 104 is able to or desires to complete the transaction and/or may ask for an alternative form of payment from user 102 if the request is denied. If the request is referred, merchant 104 may contact the transaction account issuer 140 or ask user 102 to contact the transaction account issuer 140 to provide additional information to have the request approved.

A user 102 may interact with merchant 104 from a user computer device 120 via the Internet (e.g. communications network 110) to complete the transaction (e.g. to make a purchase) such as by using third party web browser application 150. When communicating with merchant 104 through a mobile device or a computer user 102 may provide information associated with a transaction instrument (e.g., transaction account number or code, expiration date, account name, and billing address) to merchant 104 to complete a transaction.

Figure 2:
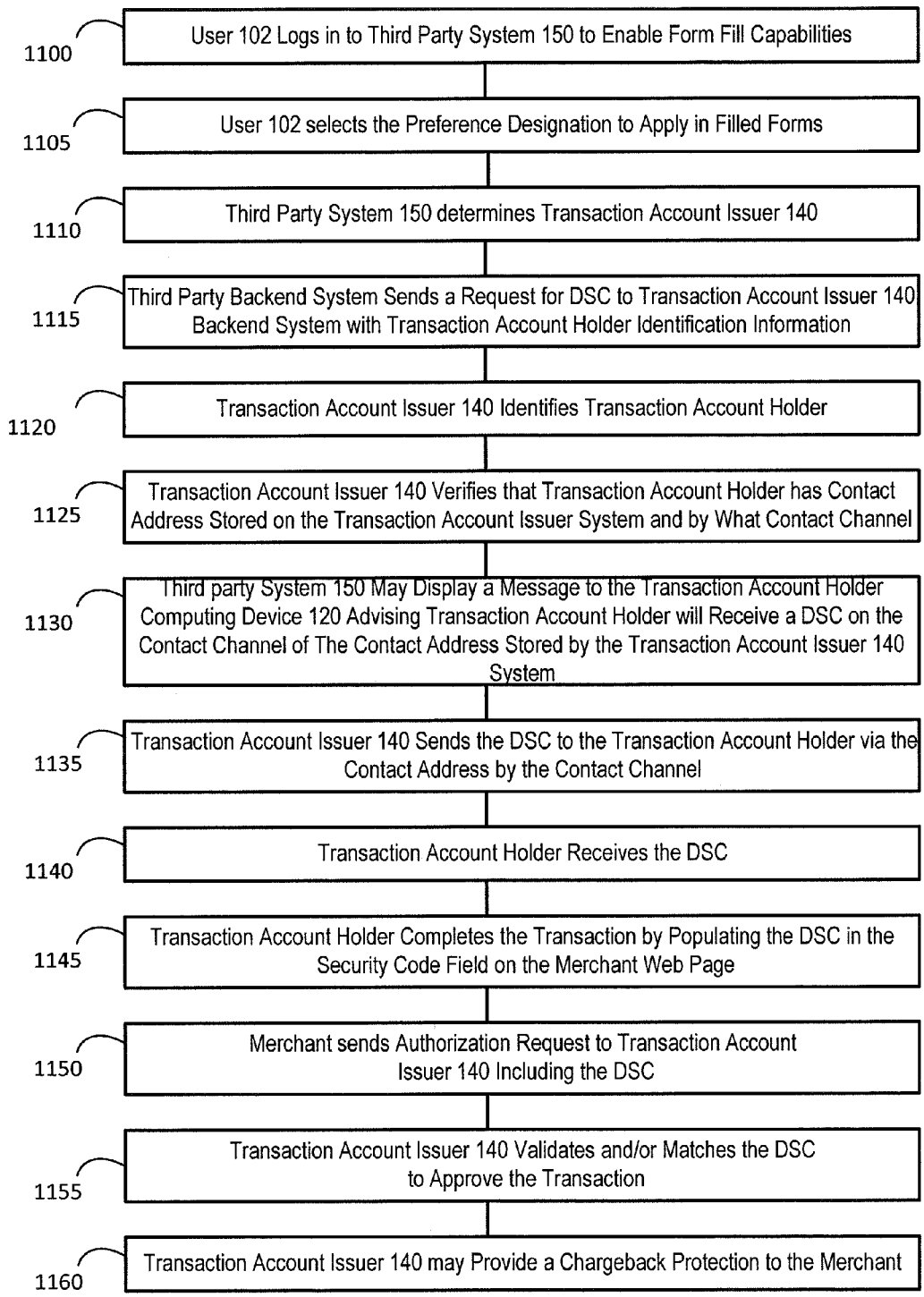
FIG. 2 is a flow chart illustrating an exemplary process for automated data entry and fraud prevention, in accordance with various embodiments.

According to various embodiments and with reference to FIG. 2, a representative process flow is depicted. User 102 may initially utilize third party web browser application 150 to browse the Internet. User 102 may interact with a merchant point of sale, such as a merchant 104 website/webpage. User 102 may select items for purchase from the merchant 104 website/webpage. At any point, once third party web browser application 150 is enabled, user 102 may log on to third party web browser application 150 to access secure preference information and/or to enable various personalized enhanced capabilities of third party web browser application 150 application (step 1100). These personalized enhanced capabilities may comprise a merchant form filling capability. For instance, for entering data into fields of a merchant 104 checkout webpage.

In response to being successfully logged in, (post verification and/or validation by third party web browser application 150) user 102 may select a preference designation to apply in filled forms. For instance, this preference designation may be an icon or a selection from a drop down list. This preference designation may be based on may form filling field and/or may be sorted based on a designator agnostic to the form filling fields. For instance, the preference designation may be based on transaction accounts, contact information, shipping addresses, or profile #1, where profile #1 has a preferred transaction account, shipping address, and/or the like.

According to various embodiments, while browsing a checkout page of a merchant website, user 102 may select a particular transaction account designator, such as a by accessing a virtual icon displayed by third party web browser application 150 (step 1105). This may prompt third party web browser application 150 to automatically populate various fields of the merchant checkout website with data associated with the selected transaction account. This may include all of the data requested by the merchant electronic form or a subset of the data requested by the merchant electronic form. For instance, selection of the transaction account icon may populate transaction account data into the electronic form while additional prompting for shipping preferences and/or contact information may follow.

Third party web browser application 150 may determine the transaction account issuer 140 of the transaction account selected (step 1110). In response to this determination, third party web browser application 150 such as via a backend system of third party web browser application 150, may contact the determined transaction account issuer system 140 and request a dynamic security code ("DSC") (step 1115). This communication may be via an application program interface (API) such as over a network 110. This communication may be based on a relationship formed between the transaction account issuer 140 and the third party. The data transmitted between the two parties may be encrypted and/or secure. The data transmitted between the two parties may be trusted and/or used as part of a confidence score.

A DSC may be used by a party involved in processing a transaction request in order to make a decision whether to authorize or deny the transaction request. In various embodiments, DSCs may be used in place of various existing card security codes, such as a CVC1, CVV1, CVV2, CVC2, CCID, CID, iCVV or Dynamic CVV, which are often a 3 or 4 digit number located on the front or back of a transaction card. The DSCs may comprise a 5-digit security code. The DSCs may comprise any number of digits, alphanumeric characters, indicators, or any other symbols. In various embodiments, the DSCs may be randomly generated. The DSCs may be dynamic single-use security codes. DSC generator (DSCG) may comprise a unique code for each consumer that generates DSCs randomly. The generated DSC code may be associated with a specific transaction account, such that the DSCs may only be used in connection with the specific transaction account. However, in various embodiments, the code may be a customer level code, such that a DSC generated by the code may be used in connection with multiple transaction accounts associated with the consumer. DSCG may store a plurality of DSCs for a transaction account. The DSCs may be stored in a database, table, list, or any other storage area capable of storing one or more DSCs. In various embodiments, the DSCs may be stored such that some or all of the DSCs are simultaneously active. However, in various embodiments, the DSCs may be stored in an ordered queue, such that only the DSC which is first in the queue is active. The use of dynamic security codes is further described in U.S. Pat. No. 7,849,014 entitled "SYSTEM AND METHOD FOR FACILITATING A FINANCIAL TRANSACTION WITH A DYNAMICALLY GENERATED IDENTIFIER," filed on Aug. 29, 2007, the contents of which are hereby incorporated by reference for any purpose in its entirety.

Third party web browser application 150 may transmit identification information, such as a user name, proxy user identifier, transaction account identifier, and/or the like such that the transaction account issuer 140 may associate the requested DSC with the proper transaction account holder (e.g. generally user 102) (step 1115). Transaction account issuer system 140 may receive this request for a DSC. Transaction account issuer system 140 may identify the correct transaction account and/or transaction account holder (user 102) and issue/generate a DSC. Transaction account issuer system 140 may store the issued DSC in a lookup table for associating with a transaction authorization request (step 1120).

According to various embodiments, transaction account issuer system 140 may verify the transaction account has appropriate contact information stored in the system. This contact information may include contact channel (e.g. email, telephone, computer, social media, instant message, other electronic message) and contact address (e.g. email address, telephone number for SMS message, social media contact name/address, instant message and/or the like (step 1125). Third party web browser application 150 may display a message to user 102 computing device 120 advising user 102 will receive a DSC on the contact channel of the contact address stored on by the transaction account issuer system (step 1130). Social media may include a social networking site and/or a web site that provides a venue for people to share their activities with family, friends and colleagues or to share their interest in a particular topic. Facebook, Google+, LinkedIn and Twitter are leading social media sites. This displayed data/message may include display of a partial identification of the contact address, such as the last four or first four characters of the user contact address.

Transaction account issuer system 140 may send the generated DSC to the user over the designated communication channel to the specified contact address (step 1135). This channel and/or contact address may be associated with third party web browser application 150. For instance, an instant message system of the third party or via an email address hosted/issued by the third party may be used.

This message may be via push message, such as a push message over a transaction account issuer 140 communication system. As used herein a push message and/or push technology may be a data distribution technology in which selected data are automatically delivered to the user's computer or mobile device in substantially real time or at prescribed intervals. E-mail messages, calendar updates and text messages are examples of data that are pushed to the user.

User 102 may receive the DSC (step 1140) in a communication transmitted from the transaction account issuer system 140. User 102 may input the DSC in the security code field on the merchant webpage (step 1145). According to various embodiments, the transaction account issuer system 140 message may automate this inputting. For example user 102 may receive a message prompting the user 102 to check their email, such as an email account hosted by third party web browser application 150. A user responding affirmatively may open the user 102 email inbox to receive the transmitted DSC. User 102 may enter this received DSC into the merchant form or the message may prompt the user with a question or verification such as "do you wish to populate this DSC into a merchant form" or "did you request this DSC." An affirmative response may result in the automatic populating by the third party system of the received DSC into the merchant security code field.

According to various embodiments, in response to user 102 submitting a complete checkout page to the merchant computer based system 115, merchant computer based system 115 may send an authorization request message to transaction account issuer 140 including the DSC (step 1150). Stated another way, merchant 104 may transmit a transaction authorization request message, such as an 1100 authorization request message as detailed in ISO 8583 via a merchant POS/computer based system 115, to authorization system 130 associated with the received transaction information. The transaction account issuer 140 may validates and/or matches the DSC to the user 102 and/or transaction account as part of the approval process (step 1155). Use of the DSC may give the transaction account issuer higher confidence that the transaction is not a fraudulent transaction. Transaction account issuer 140 may provide chargeback protection to merchant 104 based on this increased confidence (step 1160).

According to various embodiments, authorization system 130 and/or transaction account issuer 140 may perform an authorization decision. In various embodiments, authorization system 130 and/or transaction account issuer 140 may compare enhanced authorization data (as described further below) with data in a risk database. For example, the data in the risk database may indicate that the IP address associated with the user computing device 120 has been used to commit fraud in the past. In various embodiments, the risk database may contain data associated with any of the transaction data indicating positive or negative fraud risks associated with the transaction. Authorization system 130 and/or transaction account issuer 140 may use the information in the risk database in determining whether to approve or decline the authorization request.

The transaction account issuer 140 may transmit an authorization response indicating an approval or denial of the authorization request. In various embodiments, the authorization response is transmitted to the merchant 104 over network 110 and/or through gateway 125. The merchant 104 may transmit an approval or denial message to the entity. In various embodiments, the transaction account issuer 140 may transmit separate authorization responses to the merchant 104 and user 102. The authorization response may be received by a hardware component on a user computing device 120 of user 102. Hardware components may include personal computers, mobile phones, tablet devices, or any other device capable of communicating with communications network 110.

Enhanced authorization data may any data that may be used as part of a fraud determination process. Examples of enhanced authorization data elements include, for example, an automatic number identification (ANI), an email address, cookies, a contact telephone number, a ship-to-name, a ship-to-address, ship-to-store indicator, ship-to-store zip code, email address host, custom hostname, HTTP browser type, ship to country, URL of the merchant, shipping method, product SKU, number of cities, an IP address, a seller identification, and/or descriptors of goods or services associated with the transaction.

The enhanced authorization data may include at least one of user 102 name; passenger name; a national identification code associated with a particular country (such as a social security number), date of birth, a travel date; a routing description; an electronic ticket indicator; an origin city; a destination city; log in score, a class of service; a number of passengers; a reservation code; and/or carrier code. The enhanced authorization data may be provided in whole or in part, for instance providing only the last four digits of a social security number. In various embodiments, when a partial enhanced authorization data entry is provided, a computer based system may compare the partial entry against a database record for the associated user 102 and retrieve the complete enhanced authorization data record.

Enhanced authorization data may be additional data elements that allow a transaction processor/fraud prevention tool to make a decision with a higher confidence. For example, an IP address known to be associated with a user computer 120 associated with a known user 102 may grant a higher confidence that the user is in fact intentionally using their transaction account in this transaction. In another example, receiving a cookie associated with a user computing device 120 which is associated with the correct transaction account holder may give a higher confidence that the transaction is free of fraud or less likely fraudulent. According to various embodiments, a score, associated with this confidence level, may be assigned to the log on event based on various log on data.

For example, a score such as score within the range of 0-1000 may be assigned to a user's log on event. The score may be based on matching elements of the log on data with previously known/established data points. For instance, cookies associated with a known user computing device, cookies associated with programs stored on the user computing device, IP addresses associated with the user computing device, number of password attempts, number of username attempts, correct password, time of day, country code associated with data transmission, and/or correct username may be associated with a log on event. A subset of these elements may be joined into a composite group to form a score. The score may be used to authenticate a log on. The score may be used as part of a fraud risk decisioning process associated with a transaction authorization decision, such as part of enhanced authorization information.

Transaction account issuer 140 hosting the DSC may eliminate the concern of a third party storing transaction instrument security codes. The third party storage and/or user storage of sensitive information may be a security concern. Also, third party storage of various information may not be compliant with PCI data security standards.

Third party web browser application 150 may comprise algorithms and/or programming to identify fields capable of being filled with preference and/or user information. This identification may be regardless of position and/or order of the fields on the merchant 104 website 115. Thus, third party web browser application 150 may be suitably robust to identify fields in merchant 104 website 115 requiring form filled information regardless of form or layout of the electronic forms. The algorithm and/or programming of third party web browser application 150 may comprise feedback loop. For instance, should a field not be recognized by third party web browser application 150 and user 102 need to hard enter information in the field, third party web browser 150 may save a record of this phenomena. The algorithm and/or programming may be updated to eliminate these instances. Third party web browser application 150 may comprise algorithms and/or programming that is stored locally and/or in a cloud.

Importantly, while third party web browser application 150 may be used by a user 102 computing device 120, it does not involve direct merchant 104 integration. For instance, merchant 104 may have no knowledge that third party web browser application 150 is being used to complete forms for a transaction. Merchant 104 need not undergo any change to its interfaces and/or backend systems for interaction with form filling capabilities third party web browser application 150.

According to various embodiments, the code of the DSC is not the same code as the static security code that is printed on a transaction instrument. Thus, in response to third party web browser application 150 form filling data being inadvertently exposed, the transaction account information will be of limited value as the DSC is only valid with the particular transaction account for a limited period of time. In various embodiments, a DSC may include aspects as disclosed in pending U.S. patent application Ser. No. 13/708,422, entitled "AUTHENTICATION USING DYNAMIC CODES," filed Dec. 7, 2012; which is a continuation-in-part of and claims priority to U.S. application Ser. No. 13/604,976 titled "SMARTPHONE BARCODE TRANSACTIONS" and filed on Sep. 6, 2012, both of which are incorporated herein by reference in their entirety for any purpose.

According to various embodiments, enhanced authorization data associated with the data filled in the electronic form by third party web browser application 150, may be passively captured by third party web browser application 150 system and passed directly to the authorization system 130 and/or the transaction account issuer 140 at any time. In other words, transmitted directly from third party web browser application 150 without being transmitted first to a merchant 104 and/or merchant system 115. This may occur prior to user 102 transmitting the checkout page information, including the information entered in the fillable forms to the merchant 104. This enhanced authorization data may be encrypted. The sent enhanced authorization data may be captured by the authorization system 130 and/or the transaction account issuer 140 system and stored in a queue. Authorization system 130 and/or transaction account issuer 140 system may merge and/or associate the queued enhanced authorization information with a received authorization message and process the request. A fraud assessment may be performed on and/or associated with the authorization request. A fraud assessment may be performed at any time. For instance, it may be performed when enhanced authorization data is received, in response to receipt of a transaction authorization request, after receipt of a transaction authorization request, and/or prior to an authorization request being sent. Also, a fraud assessment may performed by an account issuer 140/authorization system 130/third party at any time, with or without an associated accompanying transaction authorization request, such as in response to the enhanced authorization data being passively collected/transmitted.

According to various embodiments, in response to logging in to third party web browser application 150, the IP address associated with the user computing device 120 may be captured, transmitted and verified as a first fraud check and/or authentication verification.

According to various embodiments, a proxy account number/code may be entered by third party web browser application 150 in lieu of the actual transaction account number. This proxy account number may be linked to the user transaction account for authorization and settlement. A card authorization system (CAS), generally hosted by a transaction account authorization system 130 and/or issuer 140, may issue a proxy account number to be populated by third party web browser application 150. A backend system may link/associate data elements of the user identifiers and the generated proxy account number and compare this information to received proxy account numbers and transaction authorization requests for authorization.

The present system or any part(s) or function(s) thereof) may be implemented using hardware, software or a combination thereof and may be implemented in one or more computer systems or other processing systems. However, the manipulations performed by the present disclosure were often referred to in terms, such as adding or comparing, which are commonly associated with mental operations performed by a human operator. No such capability of a human operator is necessary, or desirable in most cases, in any of the operations described herein which form part of the present disclosure. Rather, the operations are machine operations. Useful machines for performing the operation of the present disclosure include general purpose digital computers or similar devices.

Figure 3:
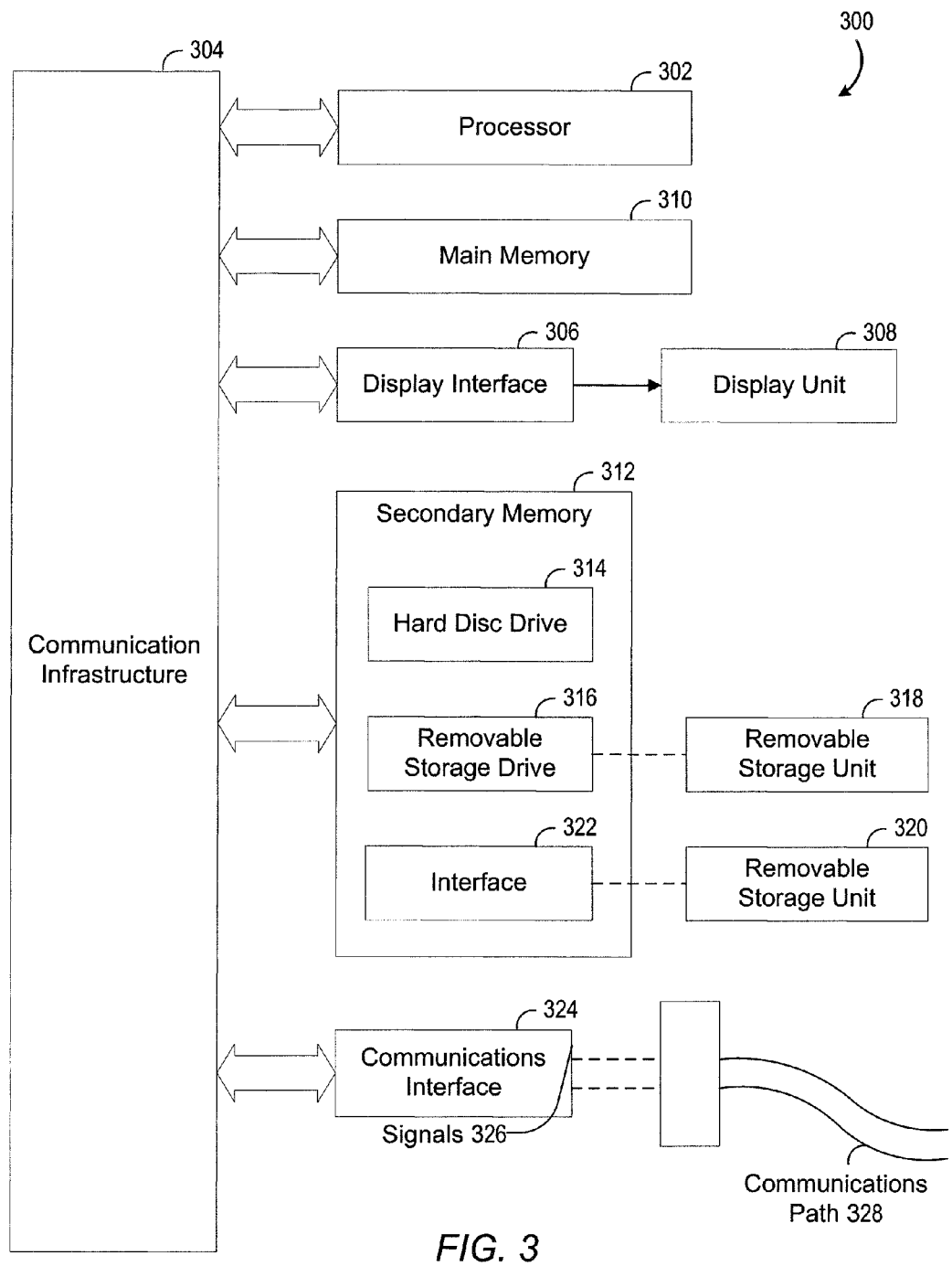
FIG. 3 depicts an exemplary computer based system applicable with various embodiments.

In fact, in one embodiment, the system is directed toward one or more computer systems capable of carrying out the functionality described herein. An example of a computer system 300 is shown in FIG. 3.

The computer system 300 includes one or more processors, such as processor 302. The processor 302 is connected to a communication infrastructure 304 (e.g., a communications bus, cross-over bar, or network). Various software embodiments are described in terms of this exemplary computer system. After reading this description, it will become apparent to a person skilled in the relevant art(s) how to implement aspects of the disclosure using other computer systems and/or architectures.

Computer system 300 can include a display interface 306 that forwards graphics, text, and other data from the communication infrastructure 304 (or from a frame buffer not shown) for display on the display unit 308.

Computer system 300 also includes a main memory 310, preferably random access memory (RAM), and may also include a secondary memory 312. The secondary memory 312 may include, for example, a hard disk drive 314 and/or a removable storage drive 316, representing a floppy disk drive, a magnetic tape drive, an optical disk drive, etc. The removable storage drive 318 reads from and/or writes to a removable storage unit 318 in a well-known manner. Removable storage unit 318 represents a floppy disk, magnetic tape, optical disk, etc. which is read by and written to by removable storage drive 316. As will be appreciated, the removable storage unit 318 includes a computer usable storage medium having stored therein computer software and/or data.

In alternative embodiments, secondary memory 312 may include other similar devices for allowing computer programs or other instructions to be loaded into computer system 300. Such devices may include, for example, a removable storage unit 320 and an interface 322. Examples of such may include a program cartridge and cartridge interface (such as that found in video game devices), a removable memory chip (such as an erasable programmable read only memory (EPROM), or programmable read only memory (PROM)) and associated socket, and other removable storage units 320 and interfaces 322, which allow software and data to be transferred from the removable storage unit 320 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 326 which may be electronic, electromagnetic, and optical or other non-transitory signals capable of being received by communications interface 324. These signals 326 are provided to communications interface 324 via a communications path (e.g., channel) 328. This channel 328 carries signals 326 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 316, a hard disk installed in hard disk drive 314, and signals 326. These computer program products provide software to computer system 300. This disclosure may be directed to such computer program products.

Computer programs (also referred to as computer control logic) are stored in main memory 310 and/or secondary memory 312. Computer programs may also be received via communications interface 324. Such computer programs, when executed, enable the computer system 300 to perform the features of the present disclosure, as discussed herein. In particular, the computer programs, when executed, enable the processor 302 to perform the features of the present disclosure. Accordingly, such computer programs represent controllers of the computer system 300.

In implementing the disclosure using software, the software may be stored in a computer program product and loaded into computer system 300 using removable storage drive 316, hard drive 314 or communications interface 324. The control logic (software), when executed by the processor 302, causes the processor 302 to perform the functions of the disclosure as described herein.

In various embodiments, the disclosure is implemented primarily in hardware using, for example, hardware components such as application specific integrated circuits (ASICs). Implementation of the hardware state machine so as to perform the functions described herein will be apparent to persons skilled in the relevant art(s). In yet various embodiments, the disclosure is implemented using a combination of both hardware and software.

In various embodiment personal information, including preference information, is stored as encrypted data in order, among other things, to prevent unauthorized access to the user's personal information stored on a user's the computer readable storage medium. The information cannot be edited or stored unless the user has been authenticated to the server computer from the main login screen, described above.

In various embodiments, third party web browser application 150, during a period of inactivity, may stop executing and not permit a user to automatically input personal information into fillable fields until the user re-logs into the system again. In various embodiments, authorization system 130 may be hosted by a transaction account issuer 140 and/or financial institution.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account. A chargeback as used herein may refer to the reversal of a prior outbound transfer of funds from a consumer's transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction (e.g., credit, debit, stored value, gift, phone, smart, RFID, and/or other accounts and instruments).

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to an "item" may include any good, service, information, experience or anything of value.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "processor" (such as a payment processor) may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

An example of matching an authorization request to a request for fraud services, as previously described, may comprise transaction account issuer 140 polling the enhanced authorization queue for a request for fraud services corresponding to the received authorization request. In various embodiments, the transaction account issuer 140 may compare fields such as time received, a merchant associated with the message, a transaction account number or a transaction amount of the authorization request with similar fields of a request for fraud services in the enhanced authorization queue. Transaction account issuer 140 may compare any data associated with the authorization request with data in the request for fraud services. For example, transaction account issuer 140 may determine that the time received of authorization request is not within a specified amount of the time received of request for fraud services and determine that request for fraud services does not correspond to authorization request. Transaction account issuer 140 may determine that the data associated with authorization request is sufficiently similar to the data associated with request for fraud services and determine that authorization request and request for fraud services correspond to the same transaction. Transaction account issuer 140 may merge the data of authorization request and request for fraud services to create an enhanced authorization message. Transaction account issuer 140 may use the enhanced authorization message to determine whether to approve or deny the authorization request. In various embodiments transaction account issuer 140 may remove the enhanced data prior to transmitting an authorization response to the merchant 104.

In various embodiments, a fraud assessment may include transmitting enhanced authorization data and/or utilizing fraud tools and/or customer level data as disclosed in U.S. patent application Ser. No. 13/411,299, entitled "SYSTEMS AND METHODS FOR ENHANCED AUTHORIZATION FRAUD MITIGATION," filed Mar. 2, 2012 (now U.S. Pat. No. 8,719,167); U.S. patent application Ser. No. 11/303,018, entitled "SYSTEM, METHOD AND COMPUTER PROGRAM PRODUCT FOR AUTHORIZING TRANSACTIONS USING ENHANCED AUTHORIZATION DATA," filed Dec. 16, 2005 (published as U.S. Pub. No. 2007/0192249, now abandoned); U.S. application Ser. No. 10/588,811, entitled "SYSTEM AND METHOD USING ENHANCED AUTHORIZATION DATA TO REDUCE TRAVEL RELATED TRANSACTION FRAUD," filed Jun. 11, 2007 (now U.S. Pat. No. 8,386,376); and U.S. application Ser. No. 12/205,412, entitled "METHOD, SYSTEM, AND COMPUTER PROGRAM PRODUCT FOR CUSTOMER-LEVEL DATA VERIFICATION," filed Sep. 5, 2008 (published as U.S. Pub. No. 2008/0314977, now abandoned), the contents of all documents are hereby incorporated by reference for any purpose in their entirety. For instance, a fraud mitigation tool and/or fraud assessment may include a data element (i.e. information that may be known by a financial transaction instrument issuer and/or the customer having a financial transaction instrument issued by the financial transaction instrument issuer as the enhanced authorization data, such as a whole or partial national identification number and/or whole or partial date of birth).

In an embodiment, a fraud mitigation tool and/or fraud assessment may include receiving (from the merchant for use in real-time authorization) transaction variables for a transaction involving a purchase of a travel ticket using a transaction account. The transaction variables may include at least one of a passenger name on the travel ticket, a travel date, a routing description of the travel ticket, and/or an electronic ticket indicator; and processing the transaction variables through a fraud-risk model to determine a risk factor for the transaction. The transaction authorization request may be approved based on the risk factor being within a range of acceptable values. A purchasing history of the account holder may be retrieved from a database. The transaction authorization request may be approved based on the risk factor and the purchasing history. In various embodiments, a status of the transaction account may be retrieved. The transaction authorization request may be approved based on the risk factor and the status. The transaction authorization request may be declined in response to the risk factor being within a range of unacceptable values.

In an embodiment, the fraud mitigation tool and/or a fraud assessment may include receiving a first data element including first transaction account data identifying a first transaction account, and receiving a second data element. An entity may be determined from the first transaction account data. A second transaction account associated with the entity may be identified. A determination that the second data element does not match a corresponding data element associated with the first transaction account may be made. The second data element may be compared with an entity record including second transaction account data identifying the second transaction account. The second transaction account data may be compared with the first transaction account data. A comparison result may be generated to verify the first data element based on the comparing. The comparison result may indicate that the entity is associated with an account corresponding to the first transaction account.

In various embodiments, a fraud assessment may include transmitting information associated with products involved with the transaction to identify risk associated with the transaction as disclosed in pending U.S. patent application Ser. No. 12/416,675, entitled "AUTHORIZATION REQUEST FOR FINANCIAL TRANSACTIONS," filed Apr. 1, 2009 (now U.S. Pat. No. 8,285,637); the contents of which are hereby incorporated by reference for any purpose in their entirety. For instance, a fraud mitigation tool and/or a fraud assessment may include automatically identifying at least one product from a purchase order associated with the transaction, the identification being performed based on an electronic comparison between a predefined list of products and the purchase order. A fraud mitigation tool and/or fraud assessment may include sending product details of the product through a third party (such as with an authorization request) to the financial institution. In this embodiment a notification may be received from the financial institution and/or through a third party, wherein the notification includes an authorization decision based on the product details. In this embodiment, the predefined list of products may be defined by the financial institution and/or transaction account issuer 140. The predefined list of products may be defined based on financial risk associated with a plurality of products. A unique code may be associated with each product in the predefined list of products. The unique code associated may be defined by the financial institution and/or transaction account issuer 140 and may be included as a field in the electronic transaction authorization request.

In various embodiments, a fraud assessment may include transmitting a post-authorization message for a financial transaction as disclosed in pending U.S. patent application Ser. No. 12/416,680, entitled "POST-AUTHORIZATION MESSAGE FOR A FINANCIAL TRANSACTION," filed Apr. 1, 2009 know U.S. Pat. No. 8,214,292), the contents of which are hereby incorporated by reference for any purpose in their entirety.

One skilled in the art will also appreciate that, for security reasons, any databases, systems, devices, servers or other components described herein may consist of any combination thereof at a single location or at multiple locations, wherein each database or system described herein includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

In various embodiments, components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Aspects of the disclosure may be described herein in terms of functional block components, screen shots, optional selections and various processing steps. It should be appreciated that such functional blocks may be realized by any number of hardware and/or software components configured to perform the specified functions. For example, various integrated circuit components, e.g., memory elements, processing elements, logic elements, look-up tables, and/or the like may be included, which may carry out a variety of functions under the control of one or more microprocessors or other control devices. Similarly, any software elements may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted any number of conventional techniques for data transmission, signaling, data processing, network control, and/or the like may be employed with the present system and method. Still further, detection or prevention of security issues with a client-side scripting language, such as JavaScript, VBScript or the like is contemplated with the present system and method. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Computer program instructions described herein may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

As used herein, "match" or "associated with" or similar phrases may include an identical match, a partial match, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Systems, methods and computer program products for fraud prevention and implementing fraud prevention are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the above particular machines, and those hereinafter developed, in any suitable combination, as would be appreciated immediately by one skilled in the art. Further, as is unambiguous from this disclosure, the methods described herein may result in various transformations of certain articles.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of this disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and/or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A computer-implemented method comprising:
receiving, by a web browsing application, log in information to access a form filling tool of the web browsing application;
the web browsing application providing access to the form filling tool in response to verification of the log in information;
receiving, by the web browsing application, a selection of a transaction account from a plurality of transaction accounts to populate a merchant electronic form with transaction information, wherein at least some of the plurality of transaction accounts are associated with different issuers;
identifying, by the web browsing application, an issuer of the transaction account based on an account number associated with the transaction account;
transmitting, by the web browsing application, a request for a dynamic security code to a system associated with the issuer of the transaction account in response to the identification, wherein the dynamic security code is usable as a card security code in conjunction with the account number to initiate a purchase via the merchant electronic form; and
populating, by the web browsing application, transaction information into at least one field of the merchant electronic form.

2. The method of claim 1, wherein the dynamic security code is populated into the merchant electronic form by the web browsing application.

3. The method of claim 1, wherein the dynamic security code is generated by the system associated with the issuer of the transaction account and is transmitted to a transaction account holder computing device.

4. The method of claim 1, wherein the system associated with the issuer of the transaction account determines a contact channel and a contact address of an individual associated with the transaction account.

5. The method of claim 4, wherein the contact address is at least one of an email address, an instant messaging address, a social media contact address, a telephone number, an SMS address, a mobile application messaging address, or a mobile device messaging address.

6. The method of claim 4, wherein at least one of the contact channel and the contact address of the individual is transmitted to the web browsing application by the system associated with the issuer of the transaction account.

7. The method of claim 6, further comprising displaying, by the web browsing application, a message to the individual indicating the dynamic security code is being transmitted to at least one of the contact channel and the contact address of the individual.

8. The method of claim 4, wherein at least one of the contact channel and the contact address of the individual is hosted by a host of the web browsing application.

9. The method of claim 1, wherein an individual associated with the transaction account manually populates the dynamic security code into a security code field of the merchant electronic form.

10. The method of claim 1, wherein the populating includes at least one of selecting a link and entering information into a field.

11. The method of claim 1, wherein the system associated with the issuer of the transaction account associates a received transaction authorization request comprising the dynamic security code with an individual associated with the transaction account.

12. The method of claim 1, further comprising transmitting, by the web browsing application, the merchant electronic form comprising the transaction information to a merchant associated with a transaction.

13. The method of claim 1, wherein the merchant electronic form information is usable by the merchant to generate a transaction authorization request message.

14. The method of claim 1, further comprising verifying the log in information.

15. The method of claim 1, wherein the transaction account issuer provides a chargeback protection to a transaction based on use of the web browsing application.

16. The method of claim 1, further comprising transmitting, by the web browsing application, enhanced authorization data to the transaction account issuer.

17. A computer-implemented method comprising:
receiving, by a financial institution computing system, a request to generate a dynamic security code from a web browsing application, wherein the web browsing application is configured to perform electronic form filling, and wherein the request specifies a transaction account;
generating, by the financial institution computing system, the dynamic security code, wherein the dynamic security code is usable as a card security code in conjunction with an account number of the transaction account to initiate a purchase;

determining, by the financial institution computing system, contact information of a holder of the transaction account specified by the request to generate the dynamic security code;

the financial institution computing system transmitting the dynamic security code to the account holder based on the contact information;

associating, by the financial institution computing system, a transaction authorization request message comprising the dynamic security code with the holder of the transaction account, wherein the transaction authorization request message is received from a merchant based on an electronic form that has been at least partially filled by the web browsing application; and authorizing, by the financial institution computing system, a transaction associated with the transaction authorization request message at least partially based on the associating.

18. The method of claim 17, wherein the web browsing application is configured to display a message to the holder of the transaction account indicating that the dynamic security code is being transmitted based on the contact information.

19. The method of claim 18, wherein the holder of the transaction account manually populates the dynamic security code in a security code field of a merchant electronic form.

20. A system comprising:

at least one processor; and a tangible, non-transitory memory configured to communicate with the at least one processor;

wherein the tangible, non-transitory memory has instructions stored thereon that, in response to execution by the at least one processor, cause the system to perform operations including:

a web browsing application receiving log in information to grant access to a form filling tool of the web browsing application;

the web browsing application further providing access to the form filling tool in response to verification of the log in information;

the web browsing application receiving a selection of a transaction account from a plurality of transaction accounts to populate a merchant electronic form with transaction information, wherein at least some of the plurality of transaction accounts are associated with different issuers;

the web browsing application identifying an issuer of the transaction account based on an account number associated with the transaction account;

the web browsing application transmitting a request for a dynamic security code to a transaction account issuer system in response to the identification, wherein the dynamic security code is usable as a card security code in conjunction with the account number to initiate a purchase via the merchant electronic form; and populating, by the web browsing application, transaction information into at least one field of the merchant electronic form.

* * * * *